US005166496A

United States Patent [19]
Sarkissian

[11] Patent Number: 5,166,496
[45] Date of Patent: Nov. 24, 1992

[54] SHEATHED HEAD ASSEMBLY AND PROCESS OF MAKING

[75] Inventor: Vicken R. Sarkissian, Sherman Oaks, Calif.

[73] Assignee: Delaware Capital Formation, Inc., Wilmington, Del.

[21] Appl. No.: 796,734

[22] Filed: Nov. 25, 1991

[51] Int. Cl.⁵ .............................................. B23K 9/00
[52] U.S. Cl. ................................................ 219/137.51
[58] Field of Search .............................. 219/75, 137.51

[56] References Cited

U.S. PATENT DOCUMENTS 3,703,622 11/1972 Kleppen, Jr. ............................ 219/75
4,145,595 3/1979 Keller et al. ............................ 219/75

Primary Examiner—Clifford C. Shaw
Attorney, Agent, or Firm—Jessup Beecher & Slehofer

[57] ABSTRACT

A sheathed head assembly for a welding or cutting torch includes a conductive torch head which is bonded to a conductor that feeds current to the torch head with a conductive and resilient adhesive. The conductor is helical and flexible so as to be bendable by the user to accommodate variable work situations.

6 Claims, 1 Drawing Sheet

SHEATHED HEAD ASSEMBLY AND PROCESS OF MAKING

BRIEF SUMMARY OF THE INVENTION

This invention relates to a sheathed head assembly for a welding/cutting torch. The invention is characterized by the use of a conductive, two-part, silver filled, modified epoxy adhesive to bond the conductive torch head, physically and electrically, to the conductor that feeds current to the torch head.

The invention relates particularly to a sheathed head assembly in which the conductor which feeds current to the torch head is made in the form of a pliant helix that can be bent by the operator to accommodate varying working conditions as the torch is put to use. In the past, the conductor has been brazed directly to the conductive torch head, and then an insulating sheath has been molded around the entire assembly. In the process the sheath adheres to the helix and in use bends and contorts as the operator bends the assembly to suit his purpose. Because of the heat generated by the flow of current in the helical conductor, the molded insulating sheath is weakened. When it is further stressed by being forced to bend and contort with the bending of the helical conductor, it is weakened and tends to fracture.

In accordance with the present invention the insulating sheath is molded initially only about the conductive torch head, leaving a hollow extended portion into which the helical conductor may, after the molding operation, be inserted and attached to the torch head.

In this way, the sheath is not bonded or adhered to the helical conductor, so that flexing and distortion of the helical conductor in use will not stress the insulating sheath and shorten its life.

In accordance with the present invention the interior end of the helical conductor is threaded into a bore in the torch head and screwed tightly into place to secure the conductor to the torch head. This securement is amplified by the use of a silver additive epoxy which cures at room temperature and which is conductive and resilient. The epoxy makes a conductive and adhesive bond between the inner end of the helical conductor and the conductive torch head, which resists the subsequent stressing of the head assembly as the helical conductor is bent by the operator. The present invention also resists the heat cycling which takes place in the use of the torch.

DETAILED DESCRIPTION

Figure 1:
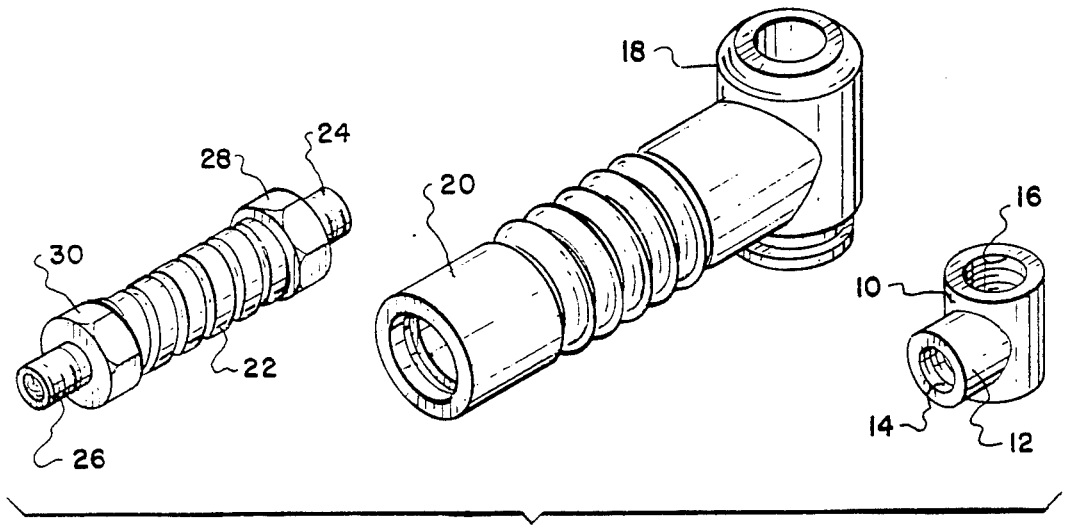
FIG. 1 is an exploded view showing the principal components of the head assembly of the present invention prior to assembly.

In FIG. 1, 10 represents a t-shaped conductive torch head having a boss 12 with a threaded bore 14 therein adapted to receive the, end of a helical conductor. Transverse of the bore 14 is a bore 16 for receiving the components that hold the torch electrode.

Molded around the torch head 10 is an insulating sheath 18 having a hollow extended portion 20, aligned axially with the threaded bore 14, and adapted to receive the helical conductor 22. The helix 22 is preferably made of malleable copper or copper alloy. After removal from the mold, the assembly is ready to receive the helical conductor 22, to each end of which is secured a threaded connecting stud 24 and 26. The connection between the end of the helical conductor 22 and the stud 24 includes an hexagonal nut structure 28 by means of which the conductor may be threaded into the bore 14 in the torch head 10. A similar hexagonal structure is associated with the distal end 26 of the conductor as shown at 30.

Figure 2:
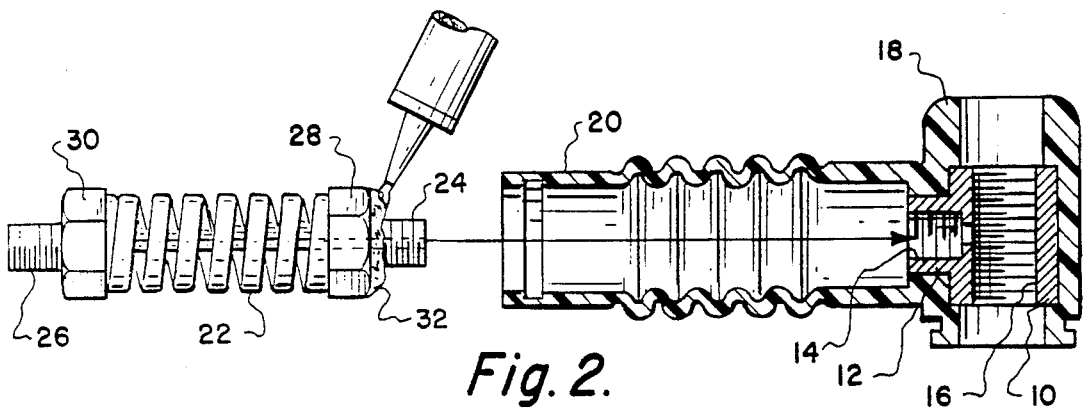
FIG. 2 is a partially exploded view showing the torch head sheathed in the insulating sheath with the extended portion ready to receive the helical conductor and with the conductive adhesive applied thereto.
Figure 3:
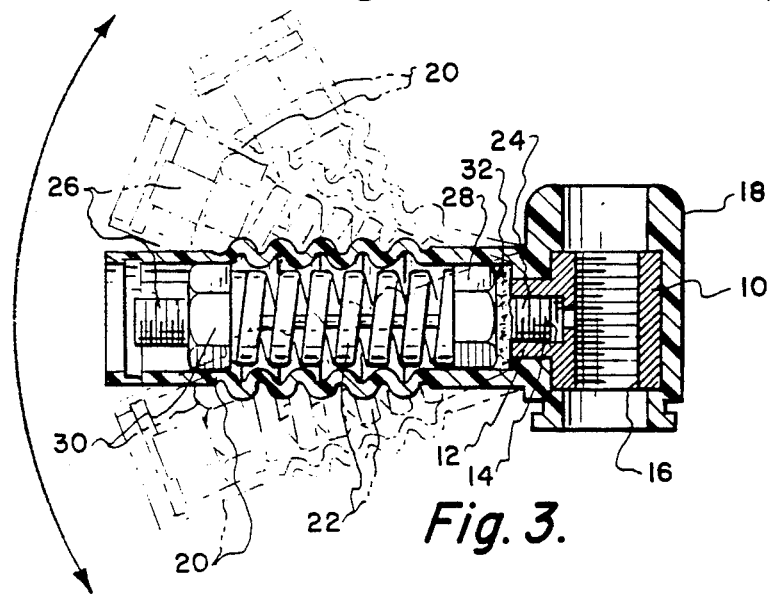
FIG. 3 is a sectional view of the assembled sheathed head assembly showing in phantom the manner in which the helical conductor is distorted in use.

After the sheathed torch head 10, shown in the right hand portion of FIG. 2, has been removed from the mold, it is ready to receive the helical conductor 22. Prior to insertion of the inner end 24 of the conductor into the threaded bore 14 of the assembly at 10, the face of the nut structure 28 is coated with a two-part, silver-filled, modified epoxy adhesive shown at 32. This coating is also applied to the threaded connector 24.

The conductor 22 is then inserted into the hollow portion of the extended portion 20, and the end 24 is threaded into the bore 14 and screwed down. This compresses the adhesive 32 which cures in place at room temperature and forms a firm physical and electrical bond between the conductor 22 and the torch head 10.

While an initial securement could be made without the adhesive 32, the continuing heat cycling and high temperature experienced by the assembly relaxes the metal parts to the point that the preloading necessary to achieve a firm physical and electrical securement is weakened. This is overcome by use of the conductive adhesive 32.

In assembling the helical conductor 22 into the hollow extended portion 20, the conductor is first inserted into the extended portion 20 and threaded initially into the bore 14 in the torch head 10. For this purpose a socket over the hex-head 30 is used. Thereafter air pressure is applied to the interior of the sheath through the cross-bore 16, causing the sheath to balloon out. This facilitates the insertion of a socket into the extended portion 20 to mate with the hex-head 28. This allows the conductor 22 to be firmly screwed into the torch head 10.

What is claimed is:

1. Sheathed head assembly for a welding/cutting torch comprising:

a conductive torch head;

a conductor electrically engaging said head and adapted to be connected to a source of electric current;

an insulating sheath surrounding said head and conductor;

a conductive resilient adhesive interposed in the engagement between said head and conductor and forming a resilient mechanical and electrical bond between said head and conductor;

thereby maintaining said engagement against separation brought about by use of said head assembly.

2. Sheathed head assembly for a welding/cutting torch comprising:

a conductive torch head having a bore;

a conductor electrically engaging into said bore and adapted to be connected to a source of electric current;

an insulating sheath surrounding said head and conductor;

a conductive resilient adhesive interposed in the engagement between said head and conductor and forming a resilient mechanical and electrical bond between said head and conductor;

thereby maintaining said engagement against separation brought about by use of said head assembly.

3. Assembly in accordance with claim 2 wherein;

said bore is threaded;

said conductor has means on one end for threading into said bore, the other end of said conductor having means for receiving an electric current.

4. Assembly in accordance with claim 3 wherein; said conductor is helical and flexible so as to be bendable by the user to accommodate variable work situations.

5. Process of fabricating a sheathed head assembly comprising:

forming an insulating sheath about a conductive torch head;

said sheath having an extended portion;

applying a conductive, resilient adhesive to one end of a conductor;

inserting said one end of said conductor into said extended portion and engaging same with said head;

compressing said adhesive between said conductor and said head, to bond said conductor and head together mechanically and electrically.

6. Process in accordance with claim 5 wherein;

said head has a threaded bore;

said sheath is aligned with said bore;

said conductor is threaded into said bore.

* * * * *